United States Patent [19]

Nakazawa

[11] Patent Number: 4,680,641
[45] Date of Patent: Jul. 14, 1987

[54] IMAGE PROCESSING SYSTEM

[75] Inventor: Tamotsu Nakazawa, Yokohama, Japan

[73] Assignee: Canon Kabushiki Kaisha, Tokyo, Japan

[21] Appl. No.: 756,724

[22] Filed: Jul. 19, 1985

[30] Foreign Application Priority Data

Jul. 28, 1984 [JP]  Japan .................................. 59-158281

[51] Int. Cl.⁴ ............................................. H04N 1/32
[52] U.S. Cl. .................... 358/257; 358/280; 358/286
[58] Field of Search ............... 358/256, 257, 294, 296, 358/286, 14 C, 14 SH, 293, 280

[56] References Cited

U.S. PATENT DOCUMENTS

| 4,414,579 | 11/1983 | Dattilo et al. | 358/256 |
| 4,415,981 | 11/1983 | Cutter et al. | 358/256 |
| 4,447,832 | 5/1984 | Kurata et al. | 358/293 |

Primary Examiner—Edward L. Coles, Sr.
Attorney, Agent, or Firm—Fitzpatrick, Cella, Harper & Scinto

[57] ABSTRACT

An image processing system comprises a reader for reading an image to produce an electrical image signal, and a mode selector for selecting an off-line mode for copying an image by a printer in accordance with the signal from the reader or an on-line mode for printing an image by the printer in accordance with another image signal. The mode selector preferentially selects one of those modes.

8 Claims, 3 Drawing Figures

IMAGE PROCESSING SYSTEM

BACKGROUND OF THE INVENTION

1. Field of the Invention

The present invention relates to an image processing system.

2. Description of the Prior Art

As digital signal techniques have advanced, a digital system has been adopted in a copying machine for image reproduction in which previously an analog system was mainly used, and a combination with a computer has been required. Thus, a copying machine which has an inherent off-line document copying function as well as a function which enables connection with a remote unit such as a computer or word processor for use as an on-line printer has been required.

There may occur a conflict of use between an operator who operates the copying machine and the remote unit which uses the printer. For example, if the operator of the copying machine switches the machine from an on-line mode to an off-line mode when the remote unit outputs print information, print operation is disturbed. Similar disturbance may occur if the remote unit interrupts the copying machine while the copying machine is in operation.

SUMMARY OF THE INVENTION

It is an object of the present invention to provide an image processing system which allows an image input/output apparatus to be used as both a copying machine for an operator and an image terminal device for a host computer.

It is another object of the present invention to provide an image processing system which allows a copying machine to be used as an on-line printer by a remote unit.

It is another object of the present invention to provide an image processing system which allows an image input/output apparatus to be preferentially used by a host computer.

It is another object of the present invention to provide an image processing apparatus which allows an image input/output apparatus to be used as an off-line apparatus for an operator and an on-line apparatus for an external unit in preference to one of them without sacrificing smooth operations thereof.

It is another object of the present invention to provide an interface of an image processing apparatus which allows an image terminal device to be switched between an off-line mode and an on-line mode under a predetermined condition.

DETAILED DESCRIPTION OF THE PREFERRED EMBODIMENT

Figure 1:
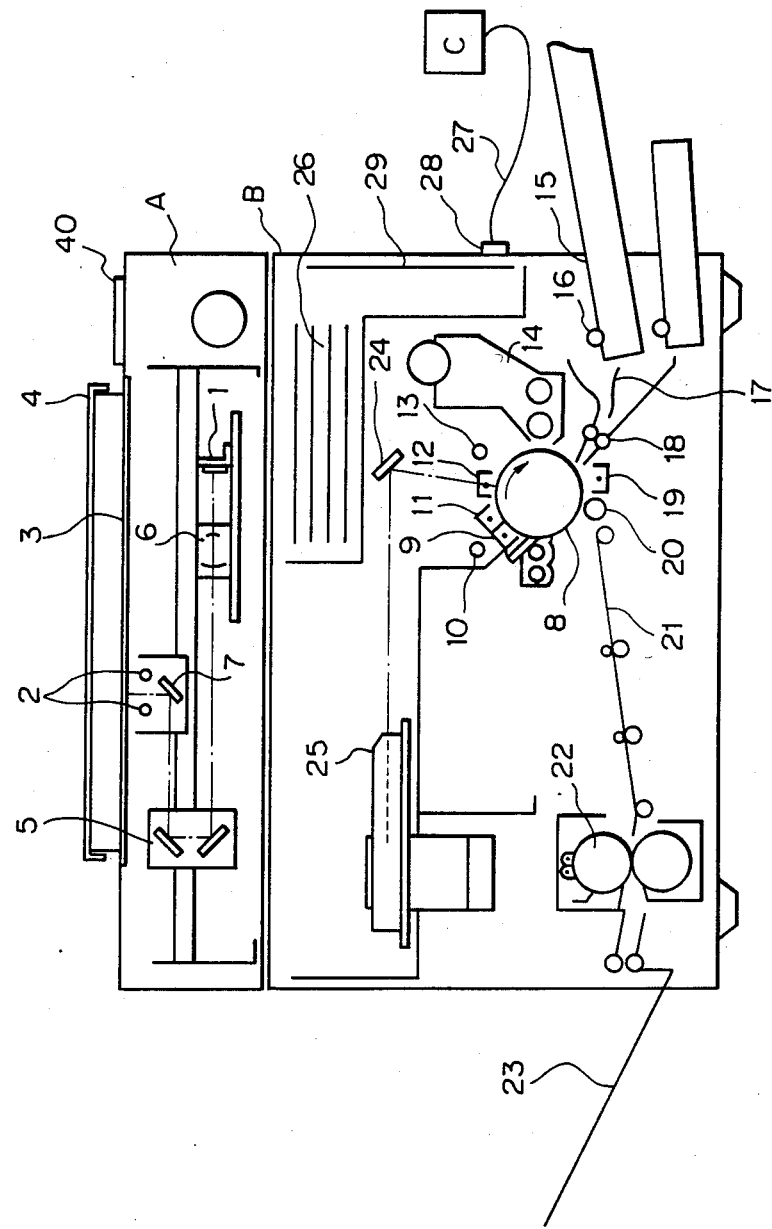
FIG. 1 is a sectional view of one embodiment of an image processing apparatus of the present invention which functions as a copying machine and a printer.

FIG. 1 is a sectional view of one embodiment of an image processing system having a terminal apparatus which functions as a copying machine and a printer.

The apparatus of the present invention comprises a reader A which reads a document image and a printer B which forms an image on a sheet. The reader A and the printer B are physically and functionally separate and they may be used as stand-alone units by themselves. Thus, an off-line copying machine is constructed by printing a document image read by the reader A, by the printer B, and an on-line printer is constructed by printing an image data from a remote unit C, such as a host computer or a word processor, by the printer B.

In the reader A, a document sheet is placed face-down on a document glass 3 and pressed to the document glass 3 by a document cover 4. The document sheet is illuminated by a fluorescent lamp 2 and light reflected therefrom is focused onto a solid-state imaging device (CCD) 1 through mirrors 5 and 7 and a lens 6. The document image read by the CCD 1 is digitized by the reader A and a resulting image data is sent to the host computer C and the printer B.

The printer B is described below. The image data processed by the reader A and bit-serially transferred to the printer B is supplied to a laser scan optical system unit 25, which comprises a semiconductor laser, a collimeter lens, a rotating polygon mirror, an F-$\theta$ lens and a correction optical system. The image signal from the reader A is applied to the semiconductor laser and electro-optically converted thereby. A laser beam emitted from the semiconductor laser is collimated by the collimeter lens and it is irradiated to the rotating polygon mirror. The laser beam from the unit 25 is directed to a photoconductor 8 through a mirror 24 so that an electrostatic latent image is formed and an image is reproduced by a well-known electrophotographic process.

Other peripheral units are explained below. Numeral 9 denotes a pre-discharger, numeral 10 denotes a pre-discharging lamp, numeral 11 denotes a primary charger, numeral 12 denotes a secondary charger, numeral 13 denotes a flat exposure lamp, numeral 14 denotes a developing unit, numeral 15 denotes a paper feed cassette, numeral 16 denotes a paper feed roller, numeral 17 denotes a paper feed guide, numeral 18 denotes a registration roller, numeral 19 denotes a transfer charger, numeral 20 denotes a separation roller, numeral 21 denotes a convey guide, numeral 22 denotes a fixing unit, numeral 23 denotes a tray, numeral 26 denotes a control unit for controlling the printer B, numeral 27 denotes a cable for connecting the present apparatus to the remote unit, numeral 28 denotes a connector, numeral 29 denotes a function switching control unit (interface) for smoothly handling conflict between the use as the off-line copying machine and the use as the on-line printer, and numeral 40 denotes a console unit for entering command data such as the number of copies and start of copy operation and on-line/off-line switching command data.

Figure 2:
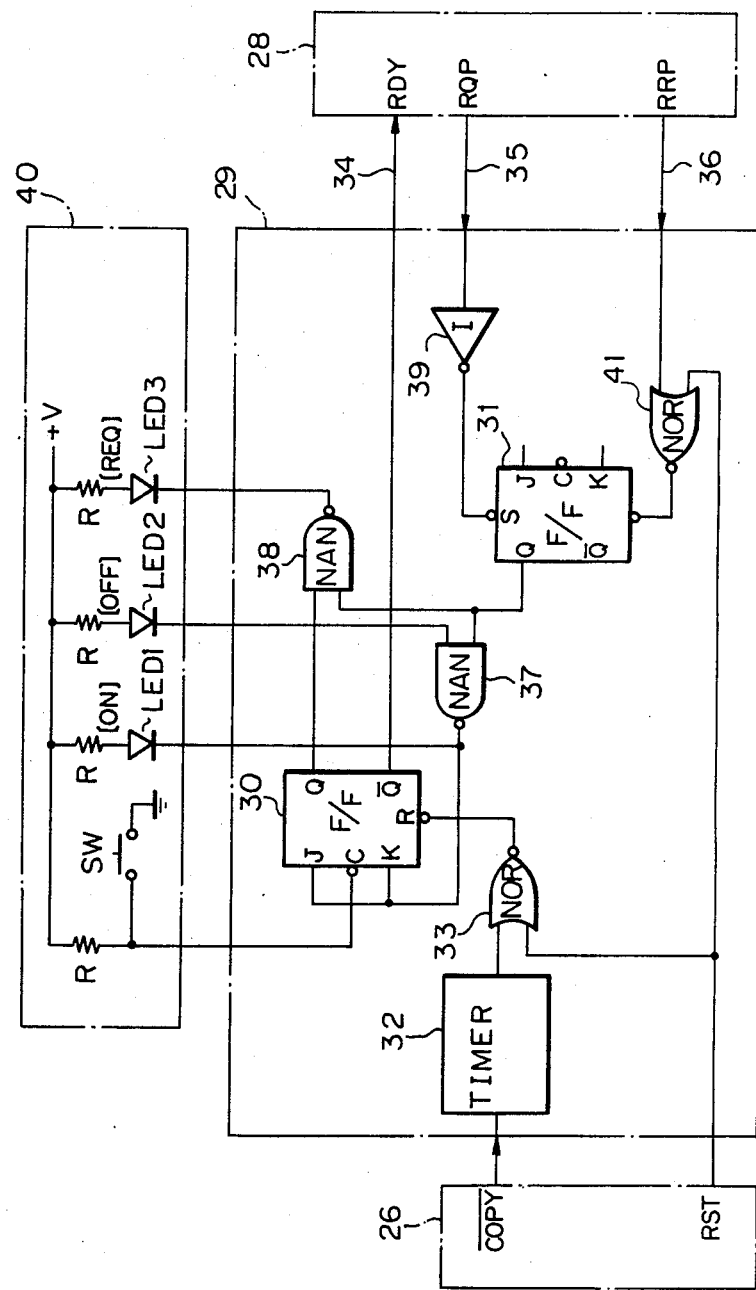
FIG. 2 shows a circuit diagram of a function switching control unit of FIG. 1.

FIG. 2 shows a circuit diagram of the function switching control unit 29 of FIG. 1. It shows the console unit 40, the control unit 26 and the connector 28 with respect to control signals supplied to and from the remote unit C.

Numeral 30 denotes an flip-flop (F/F) which holds on-line or off-line mode. When the F/F 30 is in a set state, it indicates the off-line mode and an off-line mode display LED2 is turned on. In this state, an operator can use the present terminal unit as a copying machine and enter the number of copies and start of copy command from the console unit 40. When F/F 30 is in a reset state, it send a ready signal RDY ("1") to the connector 28 through a line 34 to indicate that the printer may be used by the remote unit C. The host unit C detects the RDY signal to start the terminal unit and send the image data. In this state, if the on-line mode is not started, the operator may depress the switch SW on the console unit 40 to reverse the F/F 30 to set the off-line mode. Accordingly, the present terminal unit may be used either as the copying machine or the on-line printer.

Numeral 31 denotes a flip-flop (F/F) for indicating the presence or absence of a request from the remote unit C for use as the on-line printer. If the RDY signal is "1" and the F/F 31 is in a set state, a NAND gate 37 produces an output to indicate that the remote unit C uses the present unit as the printer and an on-line mode display LED1 is turned on. If the RDY signal is "0" and the F/F 31 is in the set state, a NAND gate 38 produces an output to turn on an on-line mode request display LED3 to inform to the operator of the copying machine the request from the remote unit C. When the operator notices the information, he/she stops the copying operation and selects the on-line mode by the switch SW to allow the present unit to be used for the remote unit. The off-line manual operation is maintained until an interrupt request is issued before the desired number of copies are made. The switch SW of the console unit 40 is an on-line/off-line selection switch. If the present unit is not being used as the on-line printer, the operator of the copying machine can reverse the F/F 30 to switch the mode each time he/she depresses the switch SW.

Numeral 32 denotes a timer. If the control unit 26 does not produce a copy start signal $\overline{COPY}$ in a predetermined time period after the setting of the off-line mode of the copying machine or after the desired number of copies have been mode in the off-line mode, the timer 32 times out to reset the F/F 30 through a NOR gate 33. The timer 32 functions to automatically switch the present unit to the on-line mode. The F/F 30 and the F/F 31 are initialized by a reset signal RST upon power-on through the NOR gate 33 and a NOR gate 41, respectively. Accordingly, when the present unit is powered on, the F/F 30 is reset and the on-line mode is initially set. Thus, the on-line mode is preferentially set so that the request from the host computer is preferentially accepted. When the remote unit wants to use the present unit as the on-line printer, it checks if the ready signal RDY on the line 34 is "1" or "0". If it is "1", it sends a request pulse signal RQP through a line 35 and resets the F/F 31 through an inverter 39. If the ready signal RDY is "1" and the F/F 31 is in the set state, the NAND gate 37 produces an output to set a J-K input of the F/F 30 to "0". Under this state, even if the operator erroneously depresses the switch SW, the F/F 30 is not reversed. Thus, the use of the present unit by the remote unit C is assured.

The remote unit C sends the request pulse signal RQP through the line 35 to set the F/F 31 even when the ready signal RDY is "0". When the ready signal RDY is "0" and the F/F 31 is in the set state, the NAND gate 8 produces the output to turn on the on-line mode request display LED3 to inform to the operator of the copying machine of the printer request from the remote unit. Then, the remote unit waits until the ready signal RDY on the line 34 changes to "1", when the present unit is available as the on-line printer. After the use as the on-line printer, the remote unit C sends a release pulse signal RRP through the line 36 to reset the F/F 31. Thereafter, the operator can freely change the mode.

When the operator wants to use the present unit as the copying machine, he/she checks if the on-line mode display LED1 is on or off. If it is on, the off-line mode is not allowed. If it is off, he/she checks if the off-line mode display LED2 is on or off. If it is on, it indicates that the use as the copying machine is allowed. If it is off, he/she depresses the switch SW to set the F/F 30 to the off-line mode. If the present unit is being used by the remote unit C, he/she waits until it is released. The operator can identify the release by the turn-off of the on-line mode display LED1. After the operator has used the present unit as the copying machine, he/she depresses the switch SW to reverse the F/F 30 to the on-line mode. Even if the operator forgets to depress the switch SW, the F/F 30 is switched to the on-line mode by the timer 32 after the predetermined time interval so that the use by the remote unit is not impeded.

In this manner, the conflict between the use as the off-line copying machine and the use as the on-line printer is coordinated while the remote unit is imparted with a priority to use the image processing system. The remote use of the image processing system is smoothed by the automatic reset function to the on-line mode by the timer means and the informing function to inform the conflict of use to the operator of the off-line copying machine.

As an on-line mode request, transmission of the image data from the reader A to the bus line of the host computer is requested. In this case, the document read operation of the reader A is started by the command from the host computer and the read data is transmitted to and stored in the memory of the host computer. The off-line mode in this case may start the reader A by the command from the console unit 40 and transmit the read data to the host computer, or output the read data through the printer B.

Figure 3:
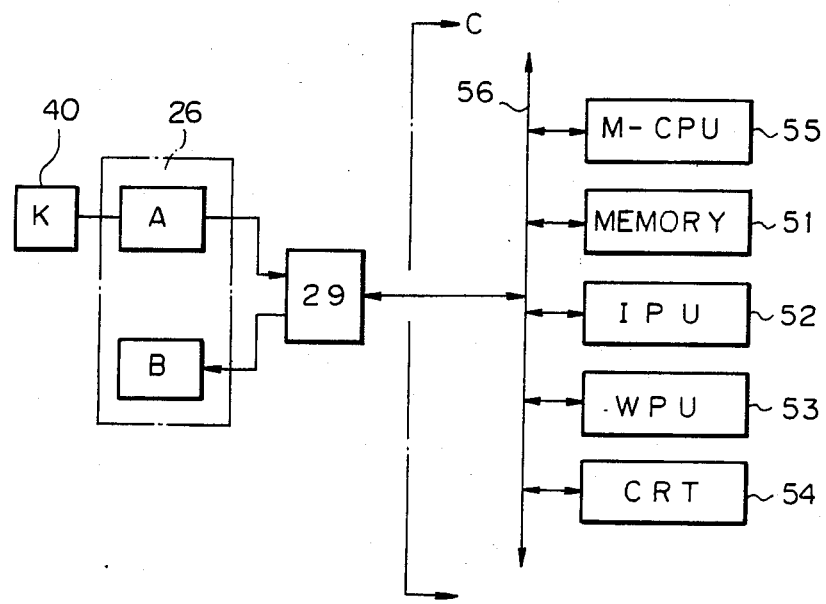
FIG. 3 is a block diagram of a host computer.

FIG. 3 shows a block diagram of the host computer C. Numeral 51 denotes a memory for storing the image data read by the reader A, numeral 52 denotes an image processor which processes (e.g. edits) the image stored in the memory 51, numeral 53 denotes a word processor which processes, e.g. edits text data inputted by the keyboard, numeral 54 denotes a CRT display/keyboard which displays the edited image or edited text, numeral 55 denotes a main processor (CPU) which controls the units 51–54, inputs the image data to the host computer C from the reader A, and outputs the edited image or edited text to the printer B, and numeral 56 denotes a bus line through which the control data and the image data of the units 51–55 are transmitted. The main processor 55 also has a function to check the status such as RDY from the controller 26 and the interface 29 and sends the command such as RQP.

In the on-line mode, the CPU checks if the command from the display/keyboard 54 requests to write the image from the reader A into the memory 51 of the host computer or to output the edited data in the memory 51 to the printer B. If it is the former, the CPU sends a command to the copying machine to connect the reader A to the host computer and start the reader A, and if it is the latter, the CPU sends a command to connect the printer B to the host computer C and start the printer B. On the other hand, in the off-line mode, the reader A and the printer B are started by the command from the keyboard 40 of the reader A, and a video line (not shown) of the interface 29 is switched so that the data read by the reader A is sent to the printer B. Since the on-line mode is preferentially executed, the reader A or the printer B may be accessed at any time as required for image editing in the host computer. If it is desired to input a priority to the copying machine for the printer B, the priorities to the on-line mode and off-line mode may be reversed. The printer B may be replaced by a display.

The present invention is not limited to the illustrated embodiment but various modifications may be made within a scope of the appended claims.

What I claim is:

1. An image processing system comprising:
   read means for reading an image and producing an electrical image signal;
   print means for printing an image; and
   mode selection means for selecting between an off-line mode for printing the image by said print means in accordance with the electrical image signal from said read means and an on-line mode for printing the image by said print means in accordance with another image signal, wherein said mode selection means preferentially selects the on-line mode.

2. An image processing system according to claim 1, wherein said mode selection means selects the on-line mode upon power-on of the system.

3. An image processing system according to claim 1, wherein said mode selection means inhibits entry of an off-line mode command in the on-line mode.

4. An image processing system according to claim 1, wherein said mode selection means inhibits the selection of the on-line mode during the copy operation in the off-line mode.

5. An image processing system comprising:
   read means for reading an image and producing an electrical image signal;
   print means for printing an image; and
   mode selection means for selecting between an off-line mode for printing the image by said print means in accordance with the signal from said read means and an on-line mode for printing the image by said print means in accordance with another image signal, wherein said mode selection means automatically selects the on-line mode a predetermined time internal after the completion of the printing operation in the off-line mode.

6. An image processing system comprising control means for selecting an operation mode of an image terminal for accessing an image including image reading and image printing;
   first input means for inputting a mode selection signal from said image terminal to said control means; and
   second input means for inputting a mode selection signal from an external unit to said control means, said second input means being different from said first input means;
   said control means preferentially selecting the mode selection signal from said external unit.

7. An image processing system comprising:
   production means for producing an electrical image signal;
   host computer means for generating another signal for image formation;
   formation means for forming an image; and
   mode selection means for selecting between an off-line mode for forming the image by said formation means in accordance with the electrical image signal from said production means, and an on-line mode for forming the image by said formation means in accordance with the other signal from said host computer means, wherein said mode selection means preferentially selects the on-line mode.

8. An image procesing system comprising:
   read means for reading an image and producing an electrical image signal;
   host computer means for data processing;
   formation means for forming an image; and
   mode selection means for selecting between an off-line mode for forming the image by said formation means in accordance with the electrical image signal from said read means, and an on-line mode for transmitting the electrical image signal read by said read means to said host computer means, wherein said mode selection means preferentially selects the on-line mode.

* * * * *

UNITED STATES PATENT AND TRADEMARK OFFICE
CERTIFICATE OF CORRECTION

PATENT NO. : 4,680,641

DATED : July 14, 1987

INVENTOR(S) : TAMOTSU NAKAZAWA

It is certified that error appears in the above-identified patent and that said Letters Patent is hereby corrected as shown below:

COLUMN 2

Lines 21-22, "collimeter" should read --collimator--.
Lines 26-27, "collimeter" should read --collimator--.
Line 60, "an" should read --a--.
Line 67, "send" should read --sends--.

COLUMN 3

Line 33, "mode" (first occurrence) should read --made--.
Line 46, ""1⇌," should read --"1",--.
Line 59, "8" should read --38--.

COLUMN 5

Line 10, "a" should read --the--.

UNITED STATES PATENT AND TRADEMARK OFFICE
CERTIFICATE OF CORRECTION

PATENT NO. : 4,680,641

DATED : July 14, 1987

INVENTOR(S) : TAMOTSU NAKAZAWA

It is certified that error appears in the above-identified patent and that said Letters Patent is hereby corrected as shown below:

COLUMN 6

Line 1, "internal" should read --interval--.

Signed and Sealed this

Twenty-sixth Day of April, 1988

Attest:

DONALD J. QUIGG

Attesting Officer

Commissioner of Patents and Trademarks